United States Patent
Huang

(10) Patent No.: US 7,263,047 B2
(45) Date of Patent: Aug. 28, 2007

(54) METHOD FOR ERASING A RE-WRITABLE DISK

(75) Inventor: Liang-Tang Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 491 days.

(21) Appl. No.: 10/711,915

(22) Filed: Oct. 13, 2004

(65) Prior Publication Data

US 2005/0088941 A1 Apr. 28, 2005

(30) Foreign Application Priority Data

Oct. 24, 2003 (TW) .............................. 92129678 A

(51) Int. Cl.
*G11B 7/00* (2006.01)
(52) U.S. Cl. ................... 369/53.31; 339/53.37
(58) Field of Classification Search ............. 369/53.31, 369/53.37
See application file for complete search history.

(56) References Cited

U.S. PATENT DOCUMENTS

| | | | | |
|---|---|---|---|---|
| 5,406,533 A | * | 4/1995 | Maeda ..................... | 369/53.16 |
| 5,615,148 A | * | 3/1997 | Yamamura et al. .... | 365/185.11 |
| 6,967,912 B1 | * | 11/2005 | Roh ........................ | 369/47.38 |

\* cited by examiner

*Primary Examiner*—Wayne Young
*Assistant Examiner*—Van T. Pham
(74) *Attorney, Agent, or Firm*—Winston Hsu

(57) ABSTRACT

The present invention discloses a method for erasing a re-writable disk. The method includes determining whether the write fail occurs in a program area of the re-writable disk when fully erasing the re-writable disk and a write fail occurs. If the write fail occurs in the program area of the re-writable disk, mode 0 data can be written on locations following a location where the write fail occurs continuously since the disk is determined to be a blank disk already. And if the write fail does not occur in the program area of the re-writable disk, the optical disk drive will issue a write fail message to a host.

4 Claims, 3 Drawing Sheets

METHOD FOR ERASING A RE-WRITABLE DISK

BACKGROUND OF INVENTION

1. Field of the Invention

The present invention relates to a method for erasing a disk, and more particularly, to a method for erasing a re-writable disk.

2. Description of the Prior Art

Optical disks have evolved from early read-only disks to writable disks. And moreover, re-writable disks, such as CD-RW disks, are gradually substituting for write-once disks.

Please refer to FIG. 1. FIG. 1 is a block diagram of an information area 10 of a re-writable disk 100. Reference character 10 refers to an information area, starting from t1 to t7. Reference character 20 refers to a test area of a first power calibration area (PCA), starting from t1 to tx. Reference character 30 refers to a counter area of the first PCA, starting from tx to t2. Reference character 40 refers to a program memory area (PMA), starting from t2 to t3. Reference character 50 refers to a lead-in area, starting from t3 to t4. Reference character 60 refers to a program area, starting from t4 to t5. Reference character 70 refers to a lead-out area, starting from t5 to t6. And reference character 80 refers to a second PCA, starting from t6 to t7.

The program area 60 is the area actually used for storing data on the disk 100. The PMA 40 stores information of all tracks on the disk 100. Further, when writing on the disk 100 is finished and the finalization is performed, a table of contents (TOC) will be written in the lead-in area 50, wherein the information of all tracks will be stored in the table of contents as well.

Generally speaking, when an optical disk drive performs an erasing operation, the optical disk drive writes mode 0 data on the disk according to the CD-RW specification. That is, if the optical disk drive detects mode 0 data, the disk is determined to be a blank disk. Moreover, when performing an erasing operation on a re-writable disk, the optical disk drive has a choice to perform a minimum erasing (mini blank) operation or a full erasing (fill blank) operation. The optical disk drive only writes mode 0 data in the PMA and the lead-in area when performing minimum erasing operation. Therefore, when a minimum erased disk is inserted into an optical disk drive, the optical disk drive checks the PMA and the lead-in area, finds mode 0 data, and accordingly determines that the disk is a blank disk. On the other hand, the optical disk drive writes mode 0 data in the program area as well as in the PMA and the lead-in area when performing a full erasing operation. Accordingly, all tracks in the program area record mode 0 data after the full erasing operation.

Please refer to FIG. 2. FIG. 2 is a block diagram of the disk 100 when a fail of writing mode 0 data occurs. When the optical disk drive performs a full erasing operation, mode 0 data will be recorded on tracks in the PMA 40, lead in area 50, and program area 60. When a write fail, such as absolute time in pre-groove (ATIP) unlock interrupt or other errors, occurs during performing an full erasing operation, the optical disk drive issues a write fail message (a servo fail message) to the host. In general, the host will command the optical disk drive to stop performing the full erasing operation after receiving the write fail message, and the host will display information about the blanking fail to the user. Therefore, when a write fail occurs, data in the disk 100 will not be erased completely. For example, assume that a write fail occurs at the location 110 in FIG. 2. Then mode 0 data is already written in the area marked with 105 before the location 110, but the locations after the location 110 (the area marked with 115) still store the original data.

SUMMARY OF INVENTION

It is therefore a primary objective of the claimed invention to provide a method for erasing a re-writable disk.

Briefly described, the claimed invention discloses a method for erasing a re-writable disk. The method includes determining whether the write fail occurs in a program area of the re-writable disk when fully erasing the re-writable disk, and writing mode 0 data on locations following a location where the write fail occurs if the write fail occurs in the program area of the re-writable disk, and issuing a write fail message to a host if the location of write fail does not occur in the program area of the re-writable disk.

The claimed invention further discloses a method for erasing a re-writable disk. The method includes writing mode 0 data onto the re-writable disk when fully erasing the re-writable disk, determining whether the write fail occurs in a program area of the re-writable disk when a write fail occurs, and writing the mode 0 data in the program area of the re-writable disk if the write fail occurs in the program area of the re-writable disk.

These and other objectives of the present invention will no doubt become obvious to those of ordinary skill in the art after reading the following detailed description of the preferred embodiment that is illustrated in the various figures and drawings.

DETAILED DESCRIPTION

When performing a full erasing operation, the write fail (servo fail) occurring in the program area simply causes tracks after the location where the write fail occurred to still record original data. However, since there is mode 0 data written in the PMA and the lead-in area already, it is reasonable to determine this disk a blank disk.

Generally speaking, when the optical disk drive writes data into the program area, all data will be overwritten. Therefore, all data stored in the disk will disappear after the overwriting, no matter what kind of data is stored in the disk.

In fact, when the optical disk drive re-writes data in the program area, the location where a write fail occurs will disappear after the overwriting. Hence it is not appropriate for the conventional optical disk drive to issue a write fail message to the host since it causes the optical disk drive to stop writing mode 0 data continuously.

Figure 1:
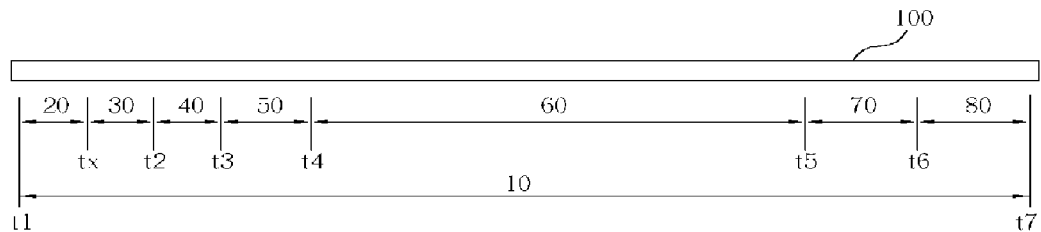
FIG. 1 is a block diagram of an information area of a prior art re-writable disk.
Figure 2:
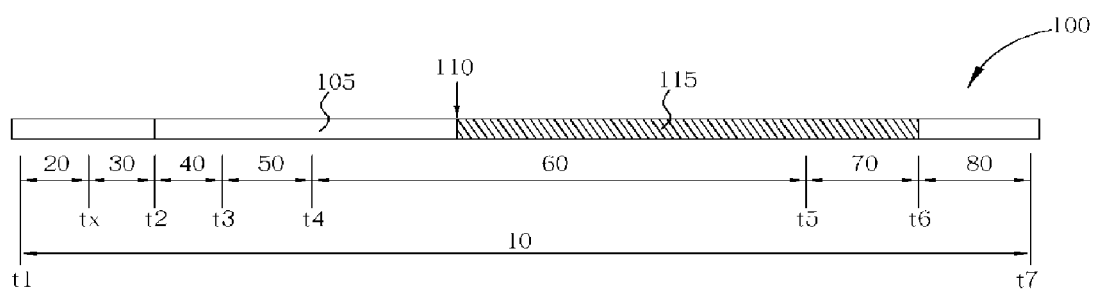
FIG. 2 is a block diagram of a prior art disk when a write fail occurs.
Figure 3:
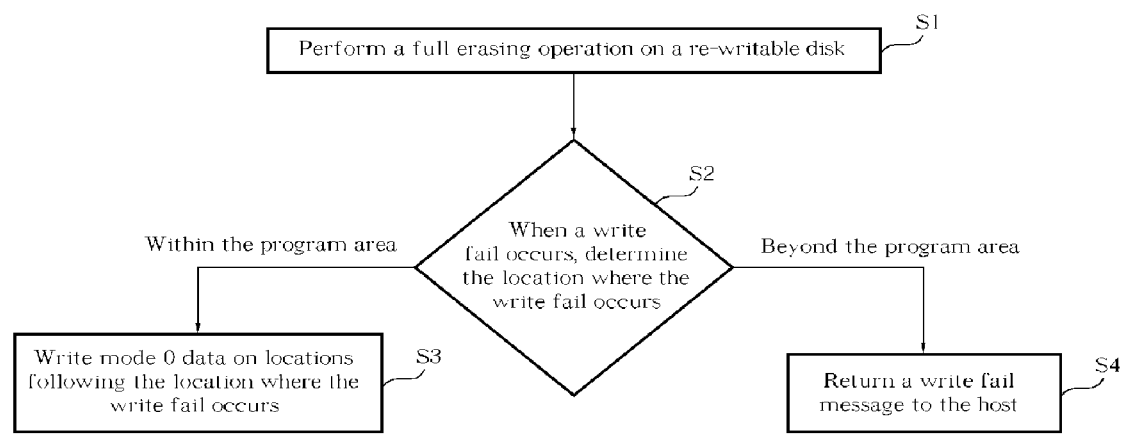
FIG. 3 is a flow chart of the present invention method for fully erasing a re-writable disk.

Please refer to FIG. 3. FIG. 3 is a flow chart of the present invention method for fully erasing a re-writable disk.

Step S1: Perform a full erasing operation on a re-writable disk;

Step S2: When a write fail occurs, determine whether the location where the write fail occurs is within the program area or not; if the location is within the program area, perform step S3; otherwise, perform step S4;

Step S3: Write mode 0 data on locations after the location where the write fail occurs;

Step S4: Issue a write fail message to the host.

As described above, when a write fail occurs during the full erasing operation, if the location where the write fail occurs is within the PMA or the lead-in area, the optical disk drive has to issue a write fail message to the host.

Figure 4:
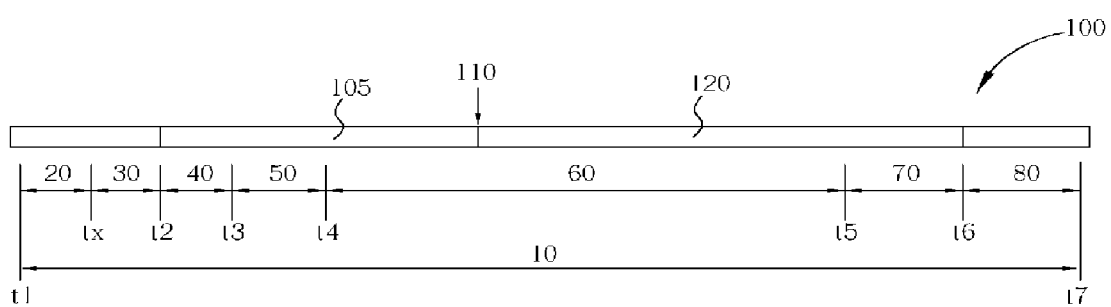
FIG. 4 is a block diagram of the present invention disk when a write fail occurs during the full erasing operation.

Please refer to FIG. 4. FIG. 4 is a block diagram of the present invention disk when a write fail occurs during the full erasing operation. If the location 110 where a write fail occurs is within the program area 60, the optical disk drive does not need to issue a write fail message to the host since the disk 100 can be determined as a completion of a minimum erasing operation. At this time, the optical disk drive may move the pick-up head to the location 110, and write mode 0 data continuously after the location 110 until the program area 60 is filled with mode 0 data. Namely, though the write fail occurs within the program area 60, the present invention allows the optical disk drive to write mode 0 data continuously in locations after the location 110 where the write fail occurs, that is, the area marked with 120 in FIG. 4.

In summary, the present invention provides a method for erasing a re-writable disk. With the claimed method, when the optical disk drive performs a full erasing operation on a re-writable disk and a write fail occurs within the PMA or the lead-in area of the re-writable disk, the optical disk drive issues a write fail message to the host. However, if the write fail occurs in the program area, the optical disk drive writes mode 0 data continuously after the location where the write fail occurs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for erasing a re-writable disk the method comprising:

when fully erasing the re-writable disk and a write fail occurs, determining whether the write fail occurs in a program area of the re-writable disc;

if the write fail occurs in the program area of the re-writable disk, writing mode 0 data on locations following a location where the write fail occurs; and if the write fail does not occur in the program area of the re-writable disk, issuing a write fail message to a host.

2. The method of claim 1 wherein the write fail message is a servo fail message.

3. The method of claim 1 wherein the write fail is an ATIP unlocked interrupt.

4. The method of claim 1 wherein the step of writing mode 0 data on locations following the location where the write fail occurs comprises driving a pick-up head to the location where the write fail occurs for writing mode 0 data on locations following the location where the write fail occurs.

* * * * *